April 30, 1968  M. LAVERGNE ET AL  3,381,264
SUBMARINE TOPOGRAPHY

Filed Nov. 18, 1966  8 Sheets-Sheet 1

INVENTORS
Michel Lavergne &
Jean-Paul Robert

BY Spencer & Kaye
ATTORNEYS

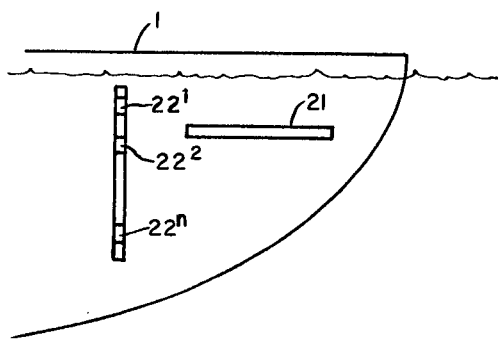
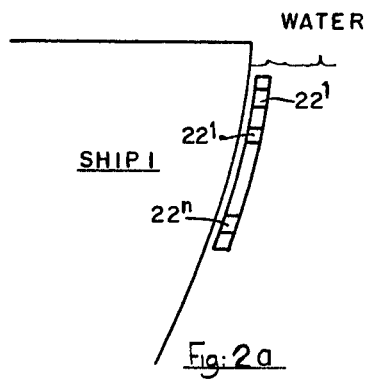
Fig. 2
Fig. 2a
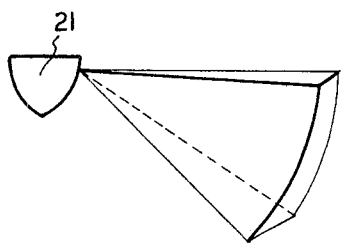
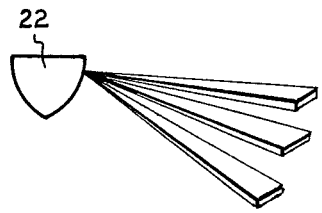
Fig. 3
Fig. 3a
INVENTORS
Michel Lavergne &
Jean-Paul Robert
BY Spencer & Kaye
ATTORNEYS April 30, 1968   M. LAVERGNE ET AL   3,381,264
SUBMARINE TOPOGRAPHY
Filed Nov. 18, 1966   8 Sheets-Sheet 8
Fig. 8
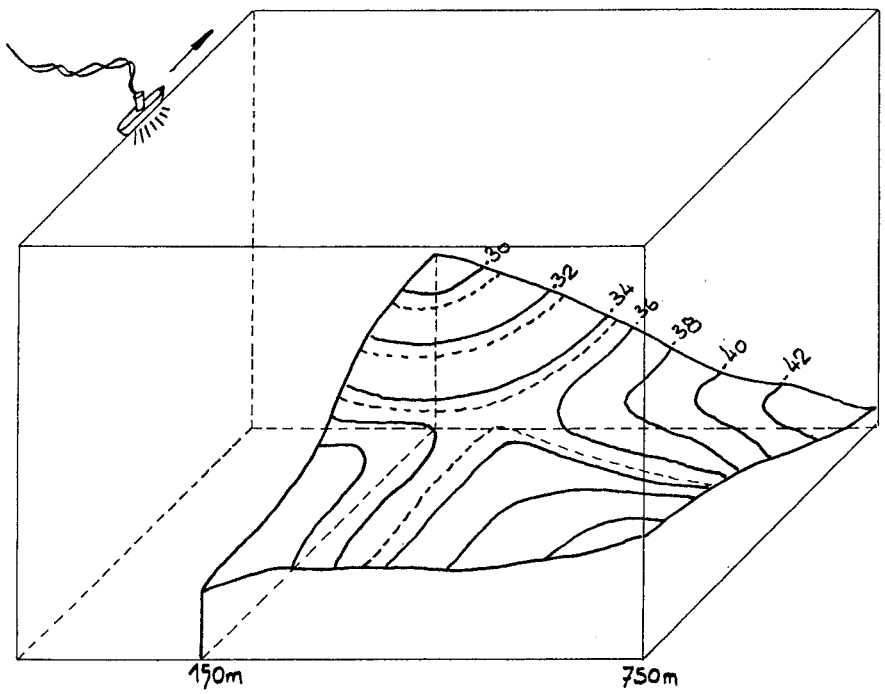
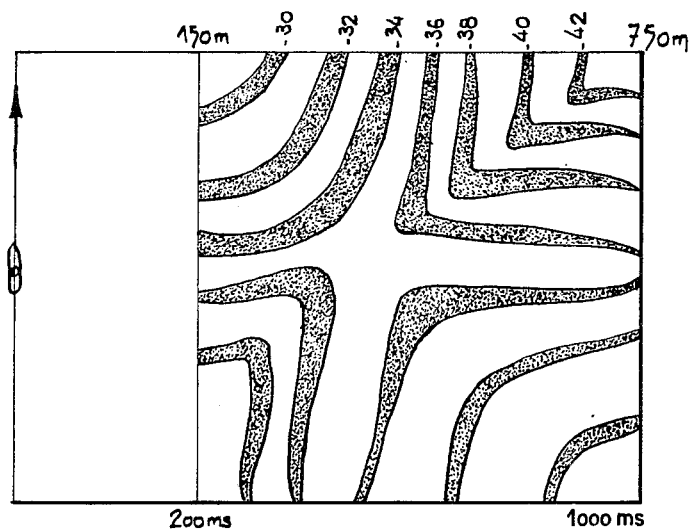
Fig. 9
INVENTORS
Michel Lavergne &
Jean-Paul Robert
BY *Spencer & Kaye*
ATTORNEYS

United States Patent Office 3,381,264
Patented Apr. 30, 1968

3,381,264
SUBMARINE TOPOGRAPHY
Michel Lavergne, Le Vesinet, and Jean-Paul Robert, Vaucresson, Hauts-de-Seine, France, assignors to Institut Francais du Petrole, des Carburants et Lubrifiants, Hauts-de-Seine, France
Filed Nov. 18, 1966, Ser. No. 595,506
Claims priority, application France, Nov. 19, 1965, 39,176
15 Claims. (Cl. 340—3)

ABSTRACT OF THE DISCLOSURE

The present invention relates to a novel method for directly determining the contour lines of the floor of a water body by emitting and receiving underwater sonic signals and by automatically processing these signals in order to obtain a topographical representation of the floor being measured. The present invention is also concerned with apparatus for carrying out this method.

---

The present invention relates to submarine topography and particularly to a novel method and apparatus for automatically obtaining a direct representation of contour lines of a portion of the floor of a body of water, or other surface.

Among the presently used methods for studying the topography of the floor of a water body are those in which either a sonar unit is fixed to the lower portion of the hull of a ship and is arranged to emit sonic waves in a vertical direction for providing an indication of the topography of a small surface portion, or a sonar of the type capable of emitting a flat fan-shaped beam or an orientable pencil beam and mounted alongside, or in front of, a moving ship and giving a simple qualitative indication of the depth of a narrow band of the bottom.

Another method for determining the topography of the floor of a water body consists in emitting and receiving sonic or ultrasonic waves in such a manner as to produce an interference pattern constiuted by the emitted or the received waves. At the intersection of each signal-reinforcing interference line with the surface to be studied, the signals forming the interference pattern will reinforce one another and, as a result, their recording will be facilitated.

However, the prior art does not suggest any method for surveying the floor of a water body in such a manner as to directly establish a representation of the contour lines of the floor. It will be well to mention at this point that a set of contour lines is, by definition, the lines of intersection of the floor, or other surface, with a plurality of equi-distant horizontal planes. The advantages which would be realized by such a method are, however, evident.

It is, therefore, a primary object of the present invention to provide a direct indication of the topography of a surface.

A further object of the present invention is to provide a direct indication of the contour lines of such surface.

A more specific object of the present invention is to directly provide a permanent recording showing the contour lines of a selected surface portion of relatively large extent.

A further object of the present invention is to provide novel methods for achieving these results.

Still a further object of the present invention is to provide novel apparatus for achieving these results.

These and other objects according to the present invention are achieved by a method and apparatus for determining the contour lines of a surface by obtaining information regarding the distance from a measuring location to points on the surface lying at uniformly spaced elevations, separated from one another by a constant distance $\Delta H$ and each constituting the elevation of a respective contour line to be plotted. The desired results are obtained by emitting at at least one point at least one signal in a predetermined transmission pattern, which signal is composed of at least one wave train, such train being constituted by oscillations having a wave length $\lambda$. The present invention additionally includes receiving at at least one point reflections of such signal according to a predetermined receiving pattern. Furthermore, the present invention provides for imparting to one of the above-mentioned patterns the form of a plurality of lobes by effectively carrying out one of the emitting and receiving steps at two points spaced from one another by a distance $h$. Finally, the desired results are obtained by varying $\lambda/h$ for controlling the geometry of such lobes to maintain the relationship $$\frac{\lambda}{h} = \frac{\Delta H}{r}$$

substantially constant at each instant of the reception of a reflection from a source of reflections at a distance $r$ from the center of a line joining said points of emission and reception.

Additional objects and advantages of the present invention will become apparent upon consideration of the following description when taken in conjunction with the accompanying drawings in which:

FIGURE 2 is a simplified pictorial diagram illustrating the arrangement of one form of apparatus according to the present invention.

FIGURE 2a is a simplified pictorial diagram taken along a plane perpendicular to that of FIGURE 2 and showing the arrangement illustrated in FIGURE 2.

FIGURE 3 is a simplified pictorial diagram taken in the same plane as that of FIGURE 2a and showing one form of signal radiation or receiving pattern which may be used in the practice of the present invention.

FIGURE 3a is a view similar to that of FIGURE 3, showing one form of signal receiving or radiation pattern which may be used in the practice of the present invention.

FIGURE 8 is a perspective view of one surface portion to be surveyed.

FIGURE 9 is a plan view of the surface portion shown in FIGURE 8 illustrating the type of recording obtained according to the present invention.

Figure 1:
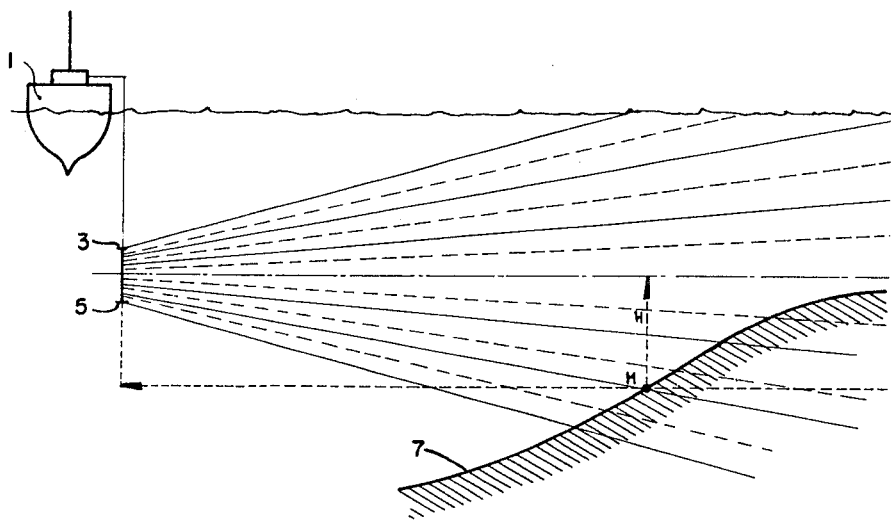
FIGURE 1 is a pictorial diagram used in explaining the technique employed according to the present invention.

Referring first to FIGURE 1, there is shown a ship 1 carrying alongside two sonar units 3 and 5, one of which units may be an emitter-receiver and the other of which units may be either an emitter or a receiver. The two units are disposed in vertical alignment with one another. Devices 3 and 5 are mounted so as to be stationary with respect to one another and with respect to the ship 1. The devices 3 and 5 can be constituted by known types of sonars and could, for example, be of a known type producing a flat, fan-shaped radiation or receiving pattern or a pencil-shaped radiation or receiving pattern. Assuming that device 3 is an emitter and device 5 is an emitter-receiver, emitters 3 and 5 are arranged so that they emit in the same vertical plane so that their sonic or ultrasonic waves strike the same narrow band of the bottom to be surveyed, which band extends transversely to the direction of travel of ship 1.

Devices 3 and 5 are arranged to simultaneously emit a train of soundwaves having the same frequency and to emit successive wave trains at regular intervals of one second, for example. The term "sound waves" will be used herein to denote elastic waves for example of sonic frequency or ultrasonic frequency. Each simultaneously emitted pair of wave trains will interfere with each other in the common vertical plane in which they are emitted in such a manner as to reinforce each other, i.e., to be in phase, along hyperbolic lines lying in this common plane and having the locations of the emitters 3 and 5 as foci. The spacing between these hyperbolic lines will be determined by the distance $h$ separating devices 3 and 5 an dby the wavelength $\lambda$ of the sound waves.

The sound waves emitted by devices 3 and 5 will be reflected from the bottom 7 and at the point of intersection of each of these hyperbolic lines with the bottom 7 and echo having a maximum amplitude will be returned to the receiving portion of device 5.

The echoes reflected from the bottom 7 will be detected by the receiver of device 5, which receiver is tuned to the frequency of the waves emitted by the two devices. The signal received by this receiver is fed to apparatus which will be described in detail below where it is recorded in the form of a trace having a plurality of peaks which correspond to the points of intersection of the hyperbolic lines with the bottom 7. As the ship advances in forward direction, i.e., perpendicular to the plane of FIGURE 1, the reflections of the successive simultaneously emitted wave trains will be recorded as a series of such traces, each trace corresponding to the simultaneous emission of a wave train by emitter 3 and by the emitter portion of device 5. Thus, each successive trace will relate to a narrow band of the bottom 7 which lies in a different vetrical plane transverse to the direction of travel of ship 1, successive bands of the bottom 7 being spaced apart by a distance equal to the distance traveled by the ship during the time interval between the emission of successive pairs of sound wave trains from the devices 3 and 5.

With reference to a single trace, each point on the trace will appear at a distance from the origin of the trace which is proportional to the time interval between the emission of the sound wave train and the portion of the reflected sound wave corresponding to that point of the trace. Thus, the sound waves reflected from points close to the devices 3 and 5 will be recorded at points closer to the origin, or starting point, of the trace than those reflected from more distant points. The amplitude of the received signal generally decreases with time and, in order to permit a clear representation of the received signal peaks corresponding to the intersection of the above-mentioned hyperbolic signal-reinforcement lines with the bottom 7, the received signal is preferably subjected to a variable amplification which compensates for this progressive amplitude decrease.

The distance from device 5 to each point of reflection on the bottom 7 can, of course, be determined by measuring the distance between the corresponding point on the trace and the origin of the trace, taken in the direction in which the trace advances. Since each successive trace corresponds to a relatively small forward displacement of the ship 1, each peak of one trace will be related to a corresponding peak on the succeeding trace and the distance of successive related peaks from their respective origins can be plotted to produce a raw curve whose variations depend on the horizontal distance and the elevation, with respect to devices 3 and 5, of the points of intersection of a respective hyperbolic signal-reinforcing line with the bottom 7 from one pulse train to the next as the ship 1 advances. It should be noted that the elevation of such intersection of each hyperbolic line will vary with the distance of the point of intersection from the sonar apparatus.

Precisely the same type of traces can be obtained by providing a single sound pulse emitter and two vertically spaced receivers tuned to the same wavelength and having their outputs connected together in parallel. When such an arrangement is used, the vertical receiving plane of the two receivers will also have associated with it a plurality of hyperbolic received-signal reinforcing lines having the two receivers as their foci.

Although raw curves of the type described above would provide valuable information as to the topography of the bottom 7, it is preferable to replace these curves with other curves representing selected horizontal contour lines of the bottom 7 and the present invention is primarily concerned with directly obtaining such contour line curves. However, in order to obtain these latter curves, it is necessary to impart some modifications to the conditions of signal emission or reception.

In FIGURE 1, the various hyperbolic lines are approximated by straight lines, for purposes of simplicity, the solid lines and the dot-dash line represent hyperbolas along which signal reinforcement occurs, i.e., along which the waves from each of the two emitters or to each of the two receivers are in phase, the broken lines represent hyperbolas along which the waves from the two emitters are out of phase and cancel one another, and the dot-dash line is a horizontal reference line extending midway between devices 3 and 5.

Figure 1A:
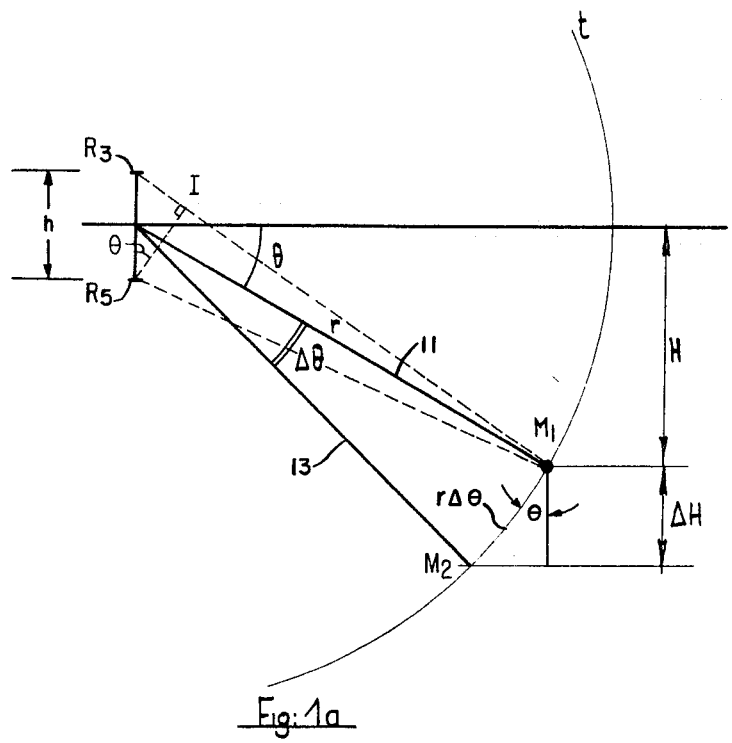
FIGURE 1a is a pictorial diagram taken in the same plane as the view of FIGURE 1 for explaining the theory of operation according to the present invention.

FIGURE 1a is a simplified pictorial diagram of an arrangement such as that shown in FIGURE 1 illustrating two adjacent hyperbolic signal-reinforcing lines, which lines form part of the radiation pattern produced if two emitters are provided, or the receiving pattern if two receivers are provided in association with a single emitter. The two hyperbolic signal-reinforcing lines are represented, for simplicity, by their asymptotes 11 and 13.

In this figure, $h$ represents the distance between the two devices $R_3$ and $R_5$, one of which is constituted by an emitter-receiver and the other of which is constituted by either an emitter or a receiver. In addition, H represents the vertical distance of the point $M_1$ of intersection of the bottom 7 with the hyperbolic line 11, $\Delta H$ represents the chosen vertical separation between successive contour lines to be determined, $r$ represents the linear distance between the point $M_1$ and the midpoint of a line joining devices $R_3$ and $R_5$. $\theta$ represents the inclination of line 11 with respect to the horizontal reference line, and $\Delta \theta$ is the angular distance between adjacent hyperbolic lines 11 and 13 required for obtaining a vertical separation of $\Delta H$ between adjacent contour lines. $\Delta \theta$ is a relatively small angle.

The condition that the points of intersection of adjacent signal-reinforcing interference lines with a circular arc $t$ of radius $r$ be separated from one another by a vertical distance $\Delta H$ requires that the variation of the difference between the distance separating each point M on arc $t$ from device $R_3$ and the distance separating such point M from the device $R_5$, when moving from point $M_1$ to point $M_2$, be equal to $\lambda$, where $\lambda$ is the wavelength, in water, of the sound wave constituting each wave train. This relationship can be expressed as follows:

$$\Delta[R_3M - R_5M] = [M_1R_3 - M_1R_5]$$
$$- [M_2R_3 - M_2R_5] = \lambda \quad (1)$$

Since $$R_3M - R_5M = R_3I = h \sin \theta$$

by differentiating it can be derived from Equation 1 that:

$$\Delta[R_3M - R_5M] = h \cos \theta \Delta\theta = \lambda \quad (2)$$

the above condition also requires that the following relationship exist:

$$r \cos \theta \Delta\theta = \Delta H \quad (3)$$

The derivation of Equation 3 is evident from FIGURE 1a.

Equations 2 and 3 can be equated to yield the following relationship:

$$\frac{\lambda}{h} = \frac{\Delta H}{r} \quad (4)$$

After the desired vertical distance $\Delta H$ between adjacent contour lines has been selected, the receiving device must be arranged such that at each instant $2t$, where $r=Vt$ and V represents the propagation velocity of the sound signal in water, the wavelength $\lambda$ and the separation $h$ are related according to Equation 4. According to that equation, it is easy to see that if it is desired to obtain a constant value for $\Delta H$, it is necessary either to vary $h$ in a manner which is proportional to $r$ (which varies in proportion to the travel time of the sound waves), or to vary $\lambda$ in a manner which is inversely proportional to $r$, or to simultaneously vary both $h$ and $\lambda$ in such a manner that Equation 4 will be satisfied at each instant.

It should be noted that Equation 4 is to be satisfied at each instant $2t$ for a wave front having a radius $r$ at each instant $t$ in order to allow for the return time of reflections from a surface portion lying at a distance $r$ from devices 3 and 5.

Several examples of the practice of the present invention will be described in detail below.

FIGURE 2 is a side view of the outline of the hull of a ship 1 provided with one arrangement for carrying out the present invention. This arrangement essentially includes an emitter 21 and a plurality of receivers $22^1$, $22^2$, ... $22^n$, the total number of receivers being equal to $n$. FIGURE 2a is an elevation view taken perpendicular to the plane of FIGURE 2 and showing that the receivers $22^1$, $22^2$, ... $22^n$ are arranged adjacent the hull of ship 1 and conform generally to the shape of the hull.

The emitter-receiver system utilized might be composed, for example, of an emitter 21 producing a relatively thin, fixed, fan-shaped signal lobe such as that shown in FIGURE 3. This lobe subtends a relatively large angle in a vertical direction perpendicular to the direction of travel of the ship 1 and a relatively narrow angle in a horizontal direction parallel to the direction of travel of the ship. This lobe thus covers an underwater band extending perpendicular to the direction of travel of the ship. The receiving device $22^1$ to $22^n$ is arranged to have a receiving pattern constituted by a plurality of lobes which are angularly displaced from one another in a vertical direction, such as is shown in FIGURE 3a. As is shown in that figure, each of these lobes subtends a horizontal angle which is substantially equal to the horizontal angle subtended by the emitter lobe and a vertical angle which is smaller than the above-mentioned horizontal angle. Each of the lobes of the receiving system coincides with a plane which extends parallel to the direction of travel of the ship. Each of these receiving lobes extends at a vertical angle which is accurately defined and which can be varied.

Such a set of receiving lobes can be obtained by combining the outputs of any two of the receivers $22^1$ to $22^n$, the distance $h$ separating the two selected receivers determining the configuration of the lobe pattern, and particularly the angular displacement between successive lobes. Alternatively, various lobe patterns can be obtained by processing all of the receiver outputs in a suitable combining circuit which imparts a suitable weighting and phase shift to each receiver output to produce a plurality of combined outputs each of which duplicates the lobe patterns produced by two receivers having a particular spacing $h$. This latter procedure is preferable, from a practical viewpoint, because the use of a plurality of receivers substantially eliminates the decreases in sensitivity in the laterally displaced lobes of a two-receiver array. The manner in which a plurality of receiver outputs must be processed in order to produce different lobe patterns is well-known in the antenna art.

Figure 4:
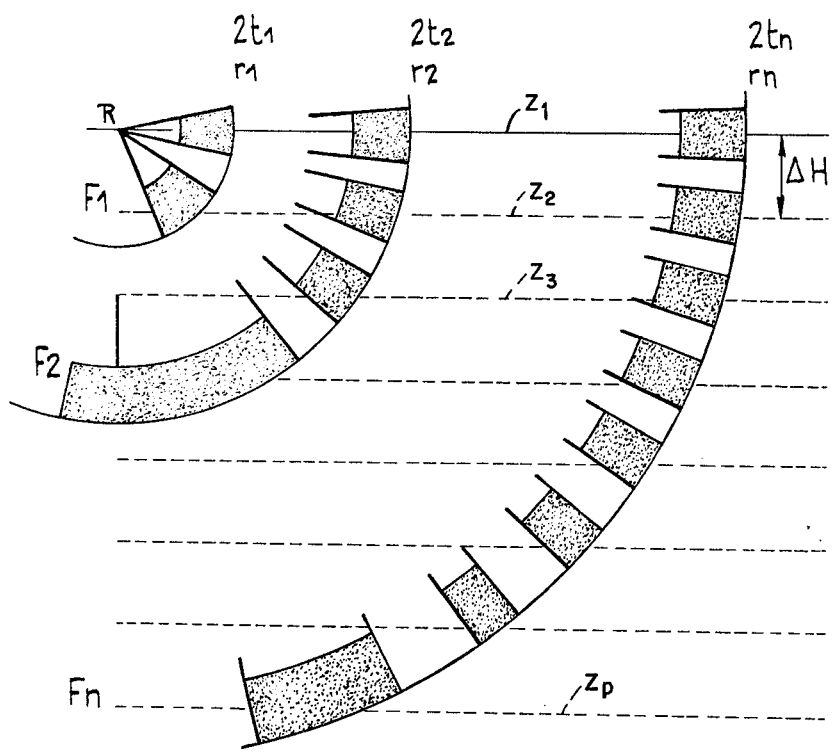
FIGURE 4 is a diagram illustrating successive lobe patterns according to which a signal may be transmitted or received in carrying out the present invention.

The highly directive receiving lobes are varied with respect to time in such a manner that they intersect the spherical wave front produced by emitter 21 at elevations $z_1, z_2, z_3, \ldots z_p$ which are constant and equidistant, the elevation, or vertical distance, between adjacent intersections of the directional receiving lobes and the wave front being equal to $\Delta H$ (FIGURE 4).

In order to permit accurate results to be obtained, the emitter device should preferably be rendered insensible to any yawing of the ship, while the receiver arrangement should be rendered insensible to any rolling of the ship by subjecting it to gyroscopic corrections in a known manner.

According to a first embodiment of the method of the present invention, a constant value for $\Delta H$ is obtained by effectively varying the spacing between the receivers. This may be accomplished, for example, by successively detecting the outputs of several groups of receivers which are spaced unequally according to a predetermined law, all of the receivers being tuned to the same frequency, or in the manner described above.

Figure 5:
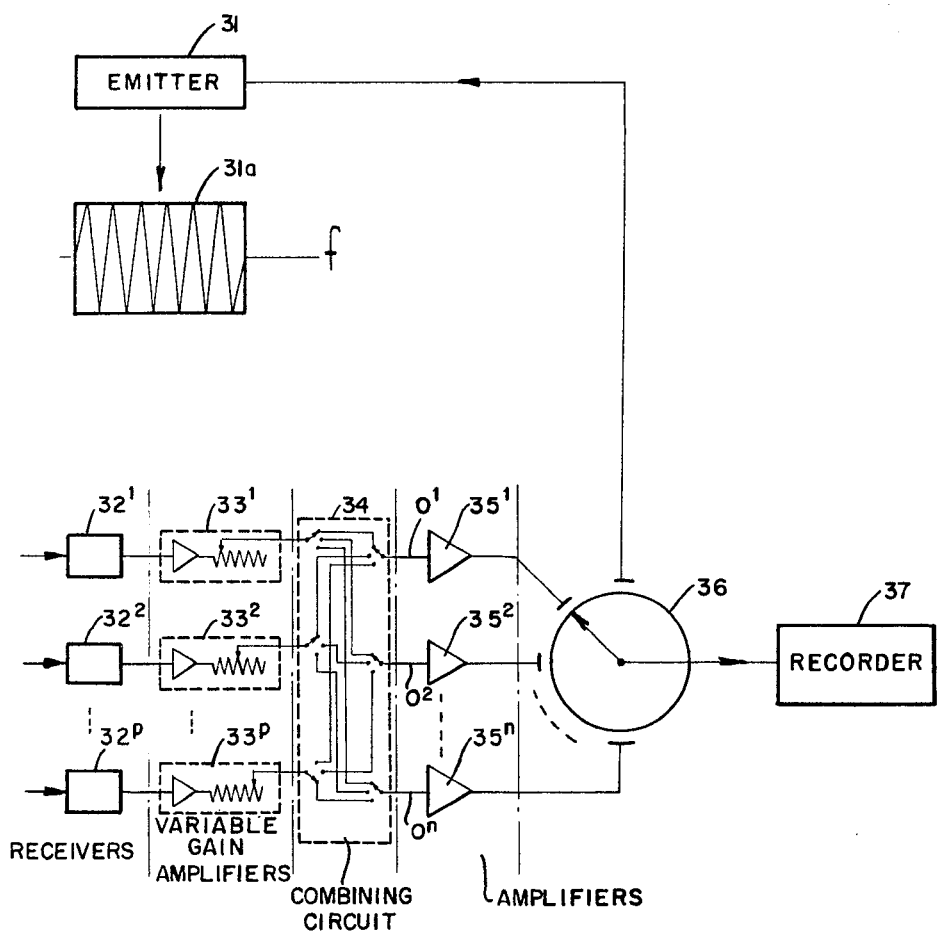
FIGURE 5 is a simplified block diagram of one embodiment of apparatus according to the present invention.

FIGURE 5 is a block diagram of one system which can be used for carrying out the present invention. This device is intended to provide a variable receiver lobe pattern by varying the effective geometry of the receiver device while maintaining the systems sensitive to a constant frequency.

In this device, an emitter 31 is triggered by a trigger pulse sent at the start of each trace period by a recorder 37 through the intermediary of a rotating switch 36. Each triggering causes the emitter to emit a sound wave pulse 31a having a duration of 1 millisecond and composed of a train of oscillations having a frequency of the order of 150 kilocycles. Each cycle of oscillation of this frequency will have a wavelength $\lambda$ of the order of 1 centimeter in water. The emitter 31 is preferably triggered once each second. The receiver device is composed of $p$ receivers, $32^1, 32^2, \ldots 32^p$, all tuned to the frequency of 150 kc. and each having its output connected to a respective one of the variable gain amplifiers $33^1, 33^2, \ldots 33^p$. All of the variable gain amplifiers have their outputs connected to a combining circuit 34 which is constructed in a known manner to combine the outputs from amplifiers $33^1$ to $33^p$, by weighting and phase shifting, in such a manner as to produce $n$ receiving lobes of predetermined directivity, each of the outputs $1, 2, \ldots n$ from combining circuit 34 being associated with one of the $n$ lobes. Each of the outputs from circuit 34 is connected to a respective one of the amplifiers $35^1, 35^2, \ldots 35^n$ each having its output connected to a respective contact of a rotary switch 36. The selector of switch 36 is permanently connected to the input of recorder 37.

The circuit of FIGURE 5 might be arranged, for example, so that the output $0^1$ of combining circuit 34 is associated with the directivity pattern $F_1$ of FIGURE 4, the lobes of this pattern being shown as shaded areas. Similarly, the output $0^2$ from circuit 34 may be associated with the lobe pattern $F_2$ of FIGURE 4 and the output $0^n$ from circuit 34 may be associated with the last lobe pattern $F_n$ of FIGURE 4.

The variable gain amplifiers $33^1, 33^2, \ldots 33^p$ are connected through the combining circuit 34 to the summing amplifiers $35^1, 35^2, \ldots 35^n$ as shown in FIGURE 5.

As is shown in FIGURE 4, the lobe pattern $F_1$ corresponds to an emitted wave front having a radius $r_1$ and centered at the location R midway between the two receivers. The front of the emitted wave reaches this distance $r_1$ at a time $t_1$ and if it should strike the bottom, or any other reflecting obstacle, along this wave front, a portion of the emitted signal will be reflected back toward the receivers and will arrive there at a time $2t_1$ after the emission of the sound wave. In order to provide a detection and recording of any reflecting surface intersecting any of the lobes of pattern $F_1$ at a distance $r_1$ from the receivers, it is necessary for the selector of switch 36 of FIGURE 5 to be connected to the output of amplifiers $35^1$, which amplifier is connected to provide an output pulse if any reflected signals are received from targets disposed in one of the lobes of pattern $F_1$. By causing the selector of switch 36 to be connected to the output of amplifier $35^1$ at the instant $2t_1$ after the emission of the signal, recorder 37 will only receive signals reflected from a target disposed a distance $r_1$ from the receivers and intersecting one of the lobes of pattern $F_1$. Similarly, by placing the selector of switch 36 in contact with the output from amplifier $35^2$ at a time $2t_2$ after the emission of a signal by emitter 31, it is possible to apply to recorder 37 a received signal corresponding to the intersection of a target at a distance $r_2$ from the receivers with one of the lobes of the pattern $F_2$. The same applies to all of the remaining lobe patterns up to, and including, the furthermost pattern $F_n$. It should be noted that although each of the lobe patterns is associated with an emitted wave front which attains a radius $r$ at a time $t$, the associated receiving lobe pattern is effectively connected to the recorder at a time $2t$ in order to allow for the return time of any echoes produced by the intersection of the wave front $r$ with an obstacle.

Regardless of the distance of the obstacle from the receivers, or the depth of the obstacle, the preselected lobe pattern $F_i$ ($i$ equals any integer from 1 to $n$) corresponds to a radial distance of $r_i$ (equals $Vt_i$) of this obstacle from the receivers, where V equals the velocity of propagation of the sound waves in the liquid. At the distance $r_i$ the lobes of the pattern $F_i$ will be vertically spaced from one another by a distance $\Delta H$ (equal to the predetermined spacing between adjacent contour lines). Thus, for any given topographic surface, the variable lobe pattern will intersect constant, equidistant contour lines. This may also be seen in FIGURE 4 wherein adjacent lobes of each successive receiving lobe pattern are always vertically spaced apart by a distance $\Delta H$.

The recorder is arranged to produce a record composed of spaced dark spots each representing the intersection of one lobe of a pattern with an obstacle. The distance of each dark spot from the origin of the record will be proportional to the radial distance $r$ from the receivers at which one of the lobes intersects the obstacle, or surface, and thus at which the obstacle has an elevation lying on one of the preselected contour lines. Thus, the record obtained for a single emitted pulse will be in the form of a series of dark spots extending substantially in a straight line, each spot corresponding to a point on the obstacle whose distance from the receivers is proportional to the distance of the spot from the origin of the trace and whose elevation corresponds to the elevation of one of the preselected contour lines. In order to obtain a record of the topography of a given area, it is necessary to produce a plurality of adjacent traces of this type, each of these traces relating to the emission of a successive pulse as the ship advances along the area being surveyed and in a direction substantially perpendicular to the direction of emission of the sound waves.

The resulting record might then have the form shown in FIGURE 9 wherein each dark line represents one contour line of the bottom. FIGURE 9 shows the record obtained by scanning a bottom having the form shown in the perspective view of FIGURE 8.

The scanned surface portion of FIGURE 8 extends between 150 m. and 750 m. from the ship. Since sound waves travel at a velocity of the order of 1500 m./sec. in sea water, the 750 m. distance corresponds to an interval of 1 second between emission of a wave and reception of its reflection and the 150 m. distance corresponds to an interval of 0.2 sec., as indicated on FIGURE 9.

It may be readily appreciated that it will not be necessary to impart any correction to the contour lines associated with distant obstacles (obstacles or surfaces whose oblique distance from the sonar system approaches the horizontal). However, it is necessary to impart such a correction if it is desired to record signals received from nearby objects. The manner in which such a correction can be made is well known and is based on a knowledge of the elevation of a point on the obstacle, as given by the elevation of its contour line, and the radial distance from the receivers to the point on the obstacle. Since the radial distance to the point can be considered as the hypotenuse of a right triangle and the elevation of the point can be considered as one leg of that triangle, the horizontal distance to the point can be readily computed. Thus, for the scanned surface of FIGURE 8, since the closest radial distance is 150 m. and the average depth is 36 m., no such correction would be required.

Although the method according to the present invention directly yields a record showing only the points on the surface lying at predetermined, uniformly spaced elevations, it is not capable of directly providing an indication of the actual depth of each elevation. To obtain this information, it is only necessary to employ a well-known technique for determining the actual depth of selected points on the measured surface. One can for instance use a classical sonar measuring water depth at the vertical under the boat.

According to one specific numerical example of the parameters which may be employed in conjunction with the apparatus of FIGURE 5, it will be assumed that $\Delta H = 2$ m., $\lambda = 1$ cm., and $f$ is maintained constant at 150 kc. Five different lobe patterns are employed to cover a distance range of 150 meters to 750 meters. The relationship between the ranges $r$, the delay times $2t$ between the emission of the signal and the recording of the reflected signal detected by each successive lobe pattern, and the effective distance $h$ between the receivers corresponding to each respective lobe pattern are as follows:

TABLE 1

| Lobe Pattern F | Distance r | Time 2t | Effective Spacing h |
|---|---|---|---|
| $F_1$ | 150 m. | 0.2 sec. | 0.75 m. |
| $F_2$ | 300 m. | 0.4 sec. | 1.50 m. |
| $F_3$ | 450 m. | 0.6 sec. | 2.25 m. |
| $F_4$ | 600 m. | 0.8 sec. | 3.00 m. |
| $F_5$ | 750 m. | 1.0 sec. | 3.75 m. |

Figure 6:
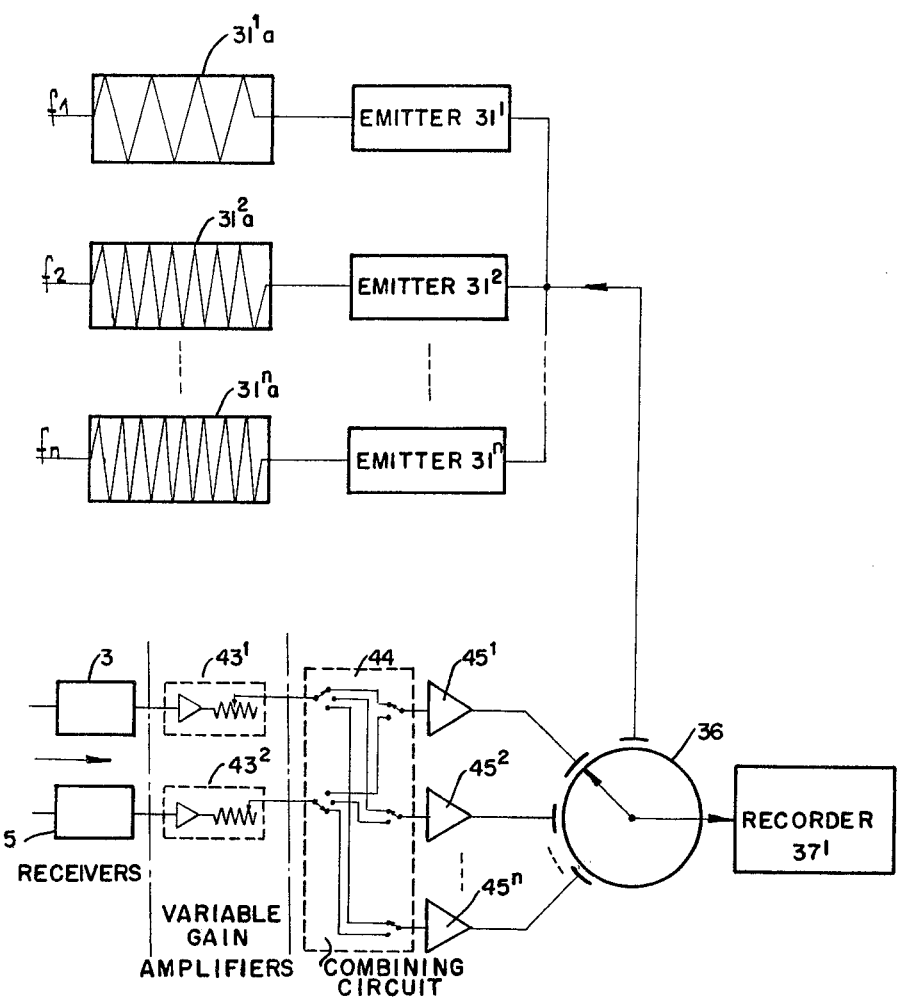
FIGURE 6 is a simplified block diagram of another embodiment of apparatus according to the present invention.

According to a second embodiment of the present invention, a system is provided in which, for obtaining a constant value of $\Delta H$, the distance $h$ between two receivers is maintained fixed and $\lambda$ is varied. An arrangement of this type is shown in FIGURE 6 to include two receivers 3 and 5 which are maintained stationary with respect to one another.

The device includes an emitter section composed of emitters $31^1$, $31^2$, ... $31^n$, all connected to receive a triggering pulse from recorded 37' at the start of each tracing period. Upon receiving such a trigger pulse, emitter $31^1$ emits a sound pulse having, for example, a duration of 1 millisecond and composed of a train of oscillations $31^1a$ having a frequency $f_1$, emitter $31^2$ emits a similar pulse $31^2a$ having a frequence $f_2$, and so on for the remaining emitters including emitter $31^n$ which emits a pulse $31^na$ having a frequency $f_n$. All of the pulses are emitted simultaneously and the emitters are preferably triggered each second. Each emitter preferably emits a signal composed of an oscillation having a frequency which is greater than that of the preceding emitter and the oscillation frequencies preferably increase uniformly from one emitter to the next. For example, five such emitters may be provided and may produce signals such that $f_1=30$ kc., $f_2=60$ kc., two successive emitters emit signals composed of oscillations having frequencies of 90 and 120 kc., respectively, and $f_n=150$ kc. Each different frequency will result in a different receiver lobe pattern, and the several lobe patterns will differ from one another in precisely the same manner as the differences resulting from variations in the effective spacing $h$ between the receivers of FIGURES 5 (see Equation 4).

The receiving arrangement is composed of two receivers 3 and 5, each connected to a respective one of the variable gain amplifiers $43^1$ and $43^2$. Receivers 3 and 5 and amplifiers $43^1$ and $43^2$ are constructed so as to be capable of receiving each of the frequencies $f_1$ to $f_2$ in succession, the signals associated with each frequency being processed by a combining circuit 44 to which the outputs of amplifiers $43^1$ and $43^2$ are connected. Each of the signals $31^1a$ to $31^na$ will produce a lobe pattern identical with a respective one of the patterns shown in FIGURE 4, with the signal of frequency $f_1$ producing a pattern identical with patern $F_1$ and the frequency $f_n$ signal producing a pattern identical with the pattern $F^n$.

Each of a plurality of summing amplifiers $45^1$ to $45^n$ has it input connected through circuit 44 to outputs of amplifiers $43^1$ to $43^n$ so as to receive the echoes of only a respective one of the signals $31^1a$ to $31^na$ and to apply this signal to a respective stationary contact of rotary switch 36.

Switch 36 has its selector permanently connected to the input of a recorder 37' and is arranged to sweep each of its contacts in succession so as to feed the output from each of the amplifiers $45^1$ to $45^n$ in succession to the recorder 37', the selector making contact with each of the amplifiers at an instant equal to an interval of $2t$ after emission, where $t$ represents the time required for the corresponding signal from the emitter to travel a distance $r$ corresponding to its respective lobe pattern. Thus, as the selector of switch 36 sweeps past the contacts in succession and in a direction from the output of amplifier $45^1$ to the output of the amplifier $45^n$, a signal is supplied to the recorder 37' which is identical with that supplied to recorder 37 of FIGURE 5 and an identical trace is produced by recorder 37'. A succession of such traces, each corresponding to one simultaneously emitted set of pulses from the emitter arrangement, will yield a chart of the type shown in FIGURE 9.

According to one specific numerical example of the parameters which may be employed in connection with the operation of the device of FIGURE 6, the two receivers 3 and 5 can be spaced apart by a vertical distance of 3.75 m., which is maintained constant, and a spacing $\Delta H$ of two meters between successive contour lines is chosen. Under these conditions, the following relationships exist, for each lobe pattern F, between the radius $r$ of the associated wave front, the time $2t$ between the simultaneous emission of a set of wave trains and the connection of each successive amplifier $45^1$ to $45^n$ to the recorder 37', the wavelength $\lambda$ of the oscillations associated with each lobe pattern, and the frequency $f$ of that oscillation:

TABLE 2

| Lobe Pattern F | Distance r | Time 2t | Wavelength L | Frequency f |
|---|---|---|---|---|
| $F_1$ | 150 m. | 0.2 sec. | 5 cm. | 30 kc. |
| $F_2$ | 300 m. | 0.4 sec. | 2.5 cm. | 60 kc. |
| $F_3$ | 450 m. | 0.6 sec. | 1.66 cm. | 90 kc. |
| $F_4$ | 600 m. | 0.8 sec. | 1.25 cm. | 120 kc. |
| $F_5$ | 750 m. | 1.0 sec. | 1.00 cm. | 150 kc. |

In practice, it is, of course, possible to construct the device so that the time interval between measurements is substantially less than 200 milliseconds.

The embodiment shown in FIGURE 6 represents the case where only two receivers are employed. However, as a practical matter, this form of construction has the drawback that the sensitivity of the laterally displaced receiving lobes is much less than that of the central lobe. It is for this reason that it is preferable, in practice, to employ more than two receivers and to combine their outputs, with appropriate relative weightings and phase shifts in a combining circuit.

It should be noted also that in the embodiment of FIGURE 6, the two receivers are disposed in the same vertical line. For convenience purposes, and particularly because of the shape of the ship hull, it might be preferable to dispose the receivers along a curved surface, such as is shown in FIGURE 2a. The resulting phase variations existing between the receivers can easily be corrected by imparting appropriate phase shifts to the signals in the combining circuit 44.

Figure 7:
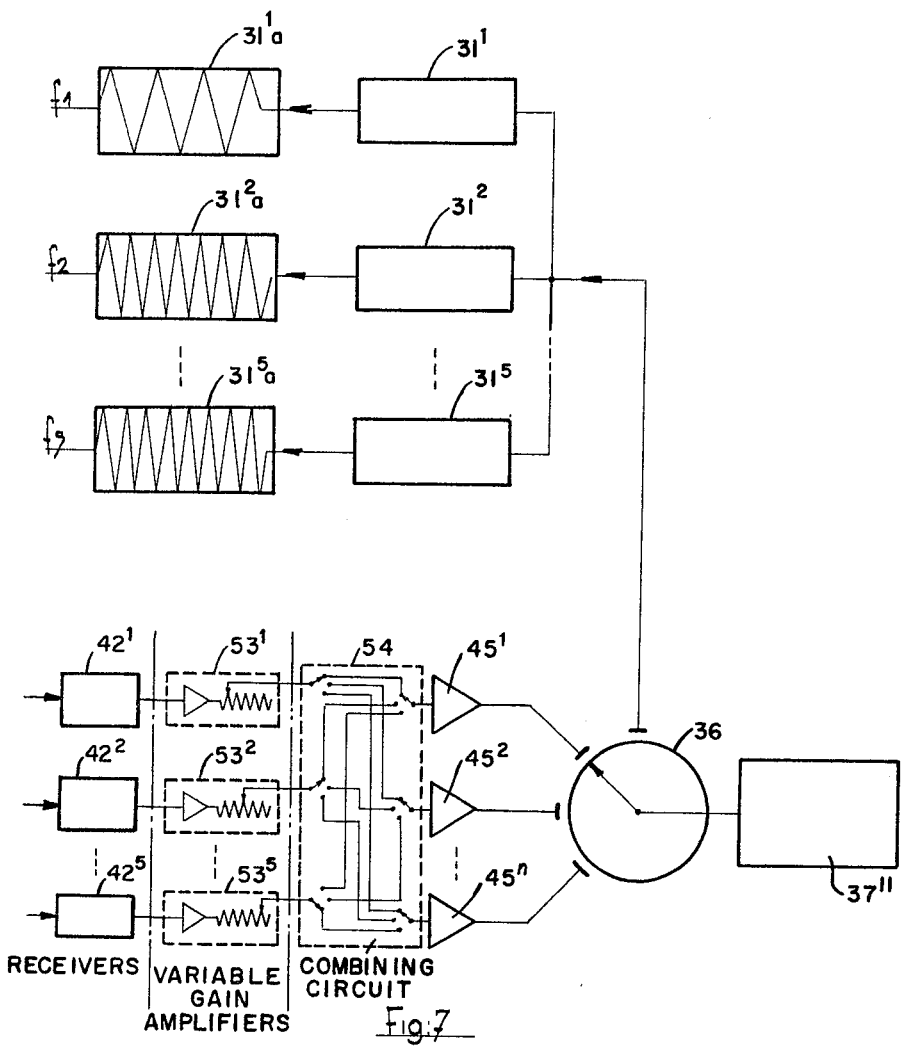
FIGURE 7 is a similar block diagram of a further embodiment of apparatus according to the present invention.

According to a third embodiment of the present invention, the present invention can be carried out by simultaneously varying $\lambda$ and $h$. One form of apparatus according to this embodiment of the invention is shown in FIGURE 7.

In this embodiment, five emitters are provided, only three of which, $31^1$, $31^2$, and $31^5$, are shown. Emitter $31^1$ is arranged to generate a pulse each time it is triggered by a signal from recorder 37'', which pulse is composed of a train of oscillations having a first frequency $f_1$. Similarly, each triggering by recorder 37'' causes emitter $31^2$ to emit a similar pulse $31^2a$ having a frequency $f_2$ and cause emitter $31^5$ to emit a similar pulse $31^5a$ having a frequency $f_5$. The frequency variation between the outputs from each of the emitters may be identical with that described above in connection with the emitters of FIGURE 6 in that $f_1$ may equal 30 kilocycles, $f_2$ may equal 60 kilocycles, $f_3$ may equal 90 kilocycles, $f_4$ may equal 120 kilocycles, and $f_5$ may equal 150 kilocycles.

The emission lobe of each emitter is preferably relatively large in a vertical plane, and is preferably greater than 40°, for example, and relatively narrow in a horizontal plane, being preferably less than 1.5°, for example.

The receiving portion of the apparatus is composed of five groups $42^1$, $42^2$, . . . $42^5$ of receivers, each group of receivers having a different geometry and a different number of receiver elements. For example group $42^1$ preferably includes $q_1$ receivers tuned to the frequency $f_1$, group $42^2$ is composed of $q_2$ receivers tuned to the frequency $f_2$, group $42^3$ (not illustrated) contains $q_3$ receivers tuned to the frequency $f_3$, group $42^4$ (not illustrated) contains $q_4$ receivers timed to the frequency $f_4$, and group $42^5$ contains $q_5$ receivers tuned to the frequency, $f_5$. The outputs from each group of receivers are connected to a respective one of the variable gain amplifiers $53^1$, $53^2$, . . . $53^5$, all having their outputs connected through a combining circuit 54 to inputs of summing amplifiers $45^1$, $45^2$, $45_n$. The combining circuit is constructed in a known manner so as to suitably process the signals which it receives in such a way as to create five groups of lobe patterns, each group of patterns being associated with a respective sonic signal frequency.

The outputs from amplifiers $45^1$ to $45_n$ are fed in succession to receiver 37'' through the intermediary of a rotary switch 36 whose selector rotates so as to come into contact with the outputs from each receiver in sequence. It should be appreciated that any number of emitters and receiver groups other than five can be used in apparatus according to the present invention.

One of the advantages of the apparatus shown in FIGURE 7 with respect to that illustrated in FIGURE 5 resides in the fact that the FIGURE 7 device can obtain a similar result employing a receiver arrangement having smaller total dimensions, the detection of nearby objects being effected by means of receiver lobe patterns associated with low frequency signals and the detection of distant objects being effected with the aid of lobe patterns associated with higher frequency signals.

According to one specific numerical example of parameters which can be employed in the operation of the device of FIGURE 7, the following relationships can be established between each range of distances and the signal frequency employed for that distance range:

TABLE 3

| r | f |
|---|---|
| 150 to 225 m. | 30 kc. |
| 225 to 375 m. | 60 kc. |
| 275 to 525 m. | 90 kc. |
| 525 to 675 m. | 120 kc. |
| 675 to 750 m. | 150 kc. |

Over each individual distance range, it is possible to vary the geometry of the operably connected receivers in the associated receiver groups in a successive manner so as to produce a succession of different receiver lobe patterns over that range. In other words, each receiver group 42 could be connected individually in the manner shown in FIGURE 5 over its respective distance range with the lobe pattern associated with each receiver combination being created in succession and with the output associated with each lobe pattern being applied in succession to the combining circuit input associated with that receiver group. As a result, it is possible to provide a substantially larger total number of lobe patterns and thus to obtain an output having a higher precision.

In all of the embodiments described in detail above, one or more fixed emitters have been used in conjunction with receivers whose geometry is varied, by varying the frequency of the emitted signal and/or by varying the spacing between the receivers actually in use. However, it should be appreciated that the present invention can also be carried out utilizing receivers having a fixed geometry and emitters having a variable geometry, it only being required that the relationship of Equation 4 be respected. If two emitters of variable geometry are employed, the term $h$ of Equation 4 will apply to the effective spacing between emitters.

Although the present invention has been described in detail in connection with sonic waves for underwater surveying, the principles of the present invention can be applied equally well to the use of airborne radar for terrestrial surveying or to the determination of the topography of close targets with the aid of laser beams, and it is to be understood that the present invention is intended to include such applications.

It will be understood that the above description of the present invention is susceptible to various modifications, changes, and adaptations, and the same are intended to be comprehended within the meaning and range of equivalents of the appended claims.

What is claimed is:

1. A method for determining the topography of a surface by obtaining information regarding the distance from a measuring location to points on the surface lying at uniformly spaced elevations separated from one another by a constant distance ΔH and each constituting the elevation of a respective contour line to be plotted, comprising the steps of:
   (a) emitting at at least one point at least one signal in a predetermined radiation pattern, which signal is composed of at least one wave train, such train being constituted by oscillations having a wavelength λ,
   (b) receiving at at least one point reflections of such signal according to a predetermined receiving patern;
   (c) imparting to one of said patterns the form of a plurality of lobes by effectively carrying out one of said emitting and receiving steps at two points spaced from one another by a distance $h$; and
   (d) varying λ/h for controlling the geometry of such lobes to maintain the relationship $$\frac{\lambda}{h} = \frac{\Delta H}{r}$$

substantially constant at each instant of the reception of a reflection from a source of reflections at a distance $r$ from the center of a line joining such points of emission and reception respectively.

2. A method as defined in claim 1, wherein the surface whose topography is to be determined constitutes the floor of a water body and wherein said step of emitting at least one signal is carried out by emitting at least one sound wave below the surface of such water body.

3. A method as defined in claim 1 wherein said step of emitting is effectively carried out at two points spaced from one another by distance $h$.

4. A method as defined in claim 1 wherein said step of receiving reflections is effectively carried out at two points spaced from one another by distance $h$.

5. A method as defined in claim 1 comprising the further step of recording the received signals for providing an indication of each incidence of an intersection of one of such lobes with the surface whose topography is to be determined, each such indication being spaced from a reference point by a distance which is proportional to the distance $r$ to its associated point of intersection.

6. A method as defined in claim 5 wherein said step of emitting at least one signal is carried out by maintaining constant the wavelength λ of the oscillations constituting each wave train, said step of receiving reflections is effectively carried out at two points spaced from one another by a variable distance $h$, and said step of varying λ/h is carried out by varying $h$ substantially in proportion to variations in $r$.

7. A method as defined in claim 5 wherein said step of emitting at least one signal is carried out by emitting signals constituted by oscillations of different wavelengths λ, said step of receiving reflections is effectively carried out at two points spaced apart by a constant distance $h$, and said steps of varying λ/h and recording are carried out by successively recording reflections of signals of progressively decreasing wavelength λ, substantially in proportion to increases in $r$.

8. A method as defined in claim 5 wherein said step of emitting at least one signal is carried out by emitting a plurality of signals each constituted by oscillations having different wavelengths λ, said step of receiving reflections is effectively carried out at two points spaced apart from one another by a variable distance $h$, and said steps of varying λ/h and recording are carried out by successively recording reflection signals of progressively decreasing wavelength, the wavelength decreasing substantially in proportion to increases in $r$, and varying $h$ in proportion to variations in $r$ during the recording of each successive signal.

9. Apparatus for determining the topography of a surface by obtaining information regarding the distance from a measuring location to points on the surface lying at uniformly spaced elevations separated from one another by a constant distance ΔH and each constituting the elevation of a respective contour line to be plotted, comprising, in combination:
   (a) emitter means for emitting at at least one point at least one signal in a predetermined radiation pattern, which signal is composed of at least one wave train, such train being constituted by oscillations having a wavelength λ;
   (b) receiver means for receiving at at least one point reflections of such signal according to a predetermined receiving pattern;
   (c) one of said means being arranged to perform its function at two points spaced from one another by a distance $h$ for imparting to its respective pattern the form of a plurality of spaced lobes;
   (d) control means operatively connected to said receiver means for varying λ/h so as to control the geometry of such lobes in order to maintain the relationship $$\frac{\lambda}{h} = \frac{\Delta H}{r}$$

substantially constant at each instant of the reception by said receiver means of reflections from a point on such surface at a distance $r$ from the center of a line joining said two spaced points.

10. An arrangement as defined in claim 9 wherein said emitter means are arranged for effectively emitting such signal from two points spaced from one another by a distance $h$.

11. An arrangement as defined in claim 9 wherein said receiving means are arranged for effectively receiving reflections at two points spaced from one another by a distance $h$.

12. An arrangement as defined in claim 9 further comprising recording means operatively connected to said receiving means for producing a record derived from the signals received by said receiving means, which record contains an indication of each incidence of the intersection of one of said lobes with the surface whose topography is to be determined, each such indication being spaced from a reference point on the record by a distance which is proportional to the distance $r$ to its associated point of intersection.

13. An arrangement as defined in claim 12 wherein said emitting means emit a signal having a constant wavelength $\lambda$, said receiving means are constituted by a plurality of receivers for effectively receiving reflections at two variable points spaced from one another by a distance $h$, and said control means are operatively connected to said receiving means for varying $h$ substantially in proportion to variations in $r$.

14. An arrangement as defined in claim 12 wherein said emitting means are arranged to emit signals constituted by oscillations of differing wavelengths, said receiving means are arranged for effectively receiving reflections at two points spaced apart by a constant distance $h$, and said control means are operatively associated with said receiving means for varying the wavelength $\lambda$ of the signals applied to said recording means substantially in inverse proportion to variations in the distance $r$.

15. An arrangement as defined in claim 12 wherein said emitting means are arranged for emitting signals composed of oscillations having a plurality of different wavelengths $\lambda$, said receiving means are arranged for effectively receiving reflections at two variable points spaced apart by a distance $h$, and said control means are operatively connected to said receiving means for applying to said recording means reflected signals having wavelengths which decrease in a stepwise manner in proportion to increases in the distance $r$, and for varying $h$ in proportion to variations in $r$ during each period when a signal of constant wavelength is being applied to said recording means.

References Cited

UNITED STATES PATENTS 3,296,579   1/1967   Farr et al. _____ 340—3

RICHARD A. FARLEY, *Primary Examiner.*